R. B. WILLIAMSON.
COIL END SUPPORT.
APPLICATION FILED OCT. 8, 1914.
1,331,970. Patented Feb. 24, 1920.
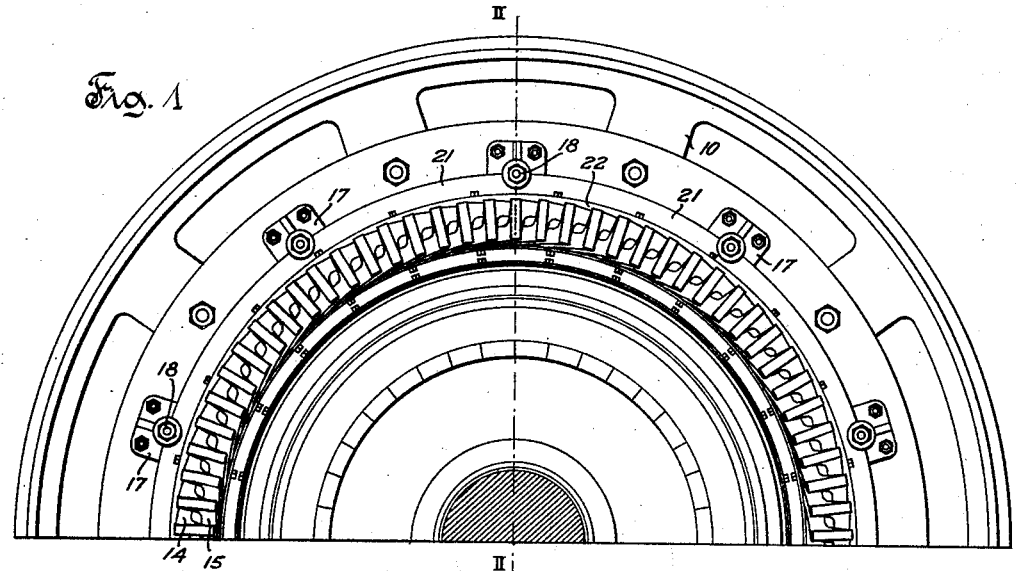
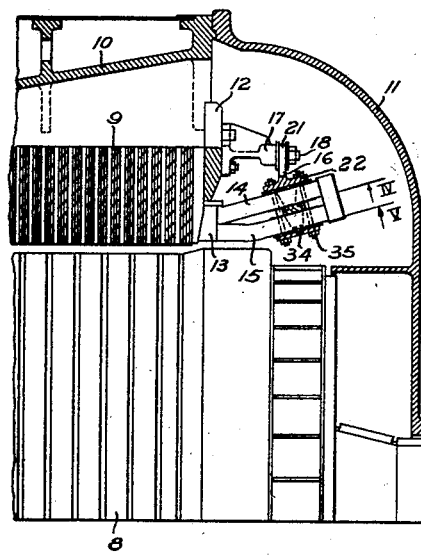
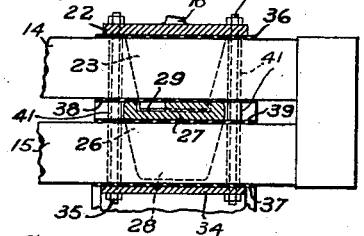
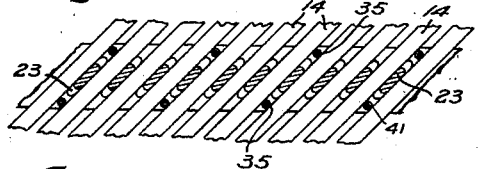
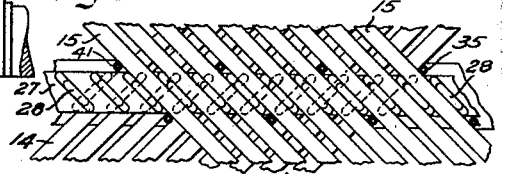
Witnesses
Rob. E. Stoll.
Inventor
R. B. Williamson
By
Attorney

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

COIL-END SUPPORT.

1,331,970.

Specification of Letters Patent. Patented Feb. 24, 1920.

Application filed October 8, 1914. Serial No. 866,135.

*To all whom it may concern:*

Be it known that I, ROBERT B. WILLIAMSON, a citizen of the United States, residing at Milwaukee, in the county of Milwaukee and State of Wisconsin, have invented a certain new and useful Improvement in Coil-End Supports, of which the following is a specification.

This invention relates in general to dynamo-electric machines, and has particular relation to devices for holding the projecting end portions of coils of such machines in fixed position.

The securing in position of the projecting portions of coils of dynamo-electric machines of considerable size is a matter of considerable moment; and, in connection with large size alternators, the design of proper means for securing and holding the projecting end portions of the coils of a stationary armature receives considerable attention. It will be apparent that the portions of the coils that are disposed within the slots of the armature are fully braced against relative movement, but, unless proper means are provided for bracing the projecting end portions outside the core, these portions are quite liable to be distorted, on the occurrence of strains which may be due to the interaction of stray magnetic fields, or to one or more coils becoming short-circuited, or to any other cause.

It is an object of this invention to provide a supporting device for the projecting end portions of the coils of a dynamo-electric machine, which is simple in design and efficient in operation.

It is a further object of this invention to provide, in a dynamo-electric machine, an improved means for supporting and bracing the projecting end portions of coils disposed on a stator core.

These and other objects are attained by this invention, the various novel features of which will appear from the description and drawings, disclosing one embodiment of such invention, and will be particularly pointed out in the claims.

In the accompanying drawings:

Figure 1 is an end view of a dynamo-electric machine, of the rotating field alternator type, with the end casing removed.

Fig. 2 is a vertical section on the line II—II of Fig. 1.

Fig. 3 is an enlarged view of the supporting means for coil ends, disclosed in Fig. 2.

Fig. 4 is an enlarged development of a section taken on a conical surface on the line IV of Fig. 2.

Fig. 5 is a view similar to Fig. 4, taken on the line V of Fig. 2.

In the drawings, the invention is shown as applied to an alternator having a rotating field 8 and a stationary armature 9, the core of the armature being mounted in a frame 10. An end casing 11 serves to protect the field 8 and the armature 9. The core laminations of the armature 9 are held in place by an end plate 12 which is secured to the frame 10.

Disposed in slots of the core of the armature 9 is a winding 13, of the distributed type and, as shown, arranged in two layers, this winding being preferably of the type in which one side of one coil is disposed in the inner part of one slot and the other side is disposed in the outer part of another slot. The layers of this winding, disposed in the inner and outer portions of the core slots, are indicated at 14 and 15, respectively, the layer 14 being disposed radially outward of the layer 15. The extending end portions of the winding are preferably bent back to some extent so as to provide space on the radially inner side thereof for the clamping means of the coil-end securing device used. The layer 14 of the winding 13, occupying the inner portion of the armature slots, is supported, at its radially outer side, by a member 16, which is held in place by a plurality of spaced brackets 17, the member 16 being secured thereto through bolts 18. The brackets 17 are secured, as by bolting or otherwise, to the end plate 12. The member 16 is preferably in the form of a ring having a radially outer web portion 21, through which the member is secured to the brackets 17, and a radially inner flange portion 22 against which the radially outer layer 14 rests. The radially inner side of this flange portion 22 is provided with a plurality of spaced and parallel projections 23, so disposed and of such thickness as to snugly fit between the adjacent end portions of the radially outer layer 14 of winding 13. These projections 23 are of such radial depth as to extend slightly beyond the radially inner side of the radially outer layer 14.

A second bracing and supporting element, 26, preferably in a plurality of segmental sections, and comprising a body portion 27 having a plurality of spaced parallel projections 28, is disposed radially inward of the member 16, the portions of the projections 23 that extend beyond the radially inner side of the radially outer layer 14, extending into recesses 29 on the radially outer side of the part 27. The projections 28 are so disposed and of such size as to fit snugly between adjacent end portions of the radially inner layer of winding 15, and, hence, are inclined in a direction opposite to the projections 23. These projections 28 extend almost to the radially inner edge of the radially inner layer 15.

In assembling the machine, portions of the radially outer layer of winding 14 are disposed between the projections 23 of the member 16, and, following this step, sections of the element 26 are placed in position with the ends of the projections 23 in the recesses 29, and the end turns of the radially inner layer are properly disposed between the projections 28. When both layers of windings are properly disposed in position between the projections of the members 16 and 26, the parts are clamped in position by means of the clamping ring 34 on the radially inner side of the radially inner layer 15 and bolts 35 which extend through this clamping plate and the flange portion 22 of the member 16, these bolts being disposed in the spaces between adjacent projecting end turns of both layers. Layers of insulating material 36 and 37 may be disposed between the web portion 22 and the radially outer layer 14 and between the clamping band 34 and the radially inner layer 15, respectively. If desired, the portion 27 may be separated from the two layers of winding through insulating sheets 38 and 39, preferably of a type that is somewhat yieldable. The winding may be protected from the bolts 35 by providing insulating tubes 41 through which these bolts pass.

It will be apparent that, when the end portions of the coils are properly disposed between the projections 23 on the member 16 and the projections 28 on the member 26, and the parts are clamped in position, through the bolts 35, against the ring member 16, which acts as an abutment, the coil ends of the outer layer are supported against any relative approach or separation, the coil ends of the radially inner layer are similarly supported, and the coils of the two layers are also supported against any relative approach or separation, and, further, against any shearing movement of one layer relative to another. In fact, each separate coil-end is braced against any possible movement that might result from strains arising during the ordinary operation of the machine, or such as might result from short-circuiting one or more sections of the winding.

It will be obvious that, although the coil-end securing means is specifically described in connection with a winding disposed on a stator member, nevertheless, in so far as the general features of the described construction are concerned, the invention is readily applicable to a winding disposed on a rotor member.

It should be understood that it is not desired to be limited to the exact details of construction shown and described, for obvious modifications will occur to a person skilled in the art.

It is claimed and desired to secure by Letters Patent:

1. In a dynamo-electric machine, a core, a winding disposed in a plurality of layers in slots in said core and extending beyond the ends thereof, means for supporting said extending portions of said winding comprising a member fixed in position relatively to said core and having an abutment and spacing and bracing projections between which the extending portions of the layer of said winding disposed at the inner part of said slots are positioned, a second member provided with spacing and bracing projections between which the extensions of the layer of said winding disposed at the outer portion of said slots are positioned, and means for clamping said members together and the first layer of said winding against the abutment of said first member.

2. In a dynamo-electric machine, a core, a winding disposed in a plurality of layers in slots in said core and extending beyond an end thereof, a member fixed in position relatively to said core and provided with parallel spacing and bracing projections disposed between the extending portions of the layer of winding at the inner part of said slots, a second member recessed to receive the extending portions of said first member and provided with parallel spaced projections disposed between the extending portions of the layer of winding at the outer part of said slots, and means for clamping said members together and securing the extending portions of the layers of said winding in position.

3. In a dynamo-electric machine, a stator core, a winding disposed in a plurality of layers in slots in said core, means for supporting the extending end portions of said layers of winding comprising an abutment member fixed in position and provided with spaced projections disposed between adjacent end portions of the radially outer layer of said winding, a member provided with spaced projections disposed between adjacent end portions of the radially inner layer of said winding, and means for securing said members together and said end portions thereto.

4. In a dynamo-electric machine, a stator core provided with a plurality of layers of winding disposed in slots in said core and extending beyond the end thereof, a plurality of brackets fixed in position relatively to said core, a member held in position by said brackets, said member being provided with radially inward extending spaced projections disposed between the end extensions of the radially outer layer of said winding, a second member recessed for the reception of a portion of the projections of said first member and provided with radially inward extending spaced projections between which the end extensions of the radially inner layer of said winding are received, and clamping means for securing said members together and said end extensions in position relatively thereto.

5. A coil end support comprising a member provided with projections forming recesses therebetween for the reception of the end extensions of a layer of conductors, and a second member recessed on one side for the reception of the projections of said first member and provided on its opposite side with spaced projections forming recesses therebetween for the reception of the end extensions of a second layer of conductors, a plate adapted to bear on the exposed side of said second layer of conductors, and means for securing said plate and said members together and said end extensions in fixed position relatively thereto.

6. In a dynamo-electric machine, a core, a winding disposed in a plurality of layers in slots in said core and extending beyond the ends thereof, the extending end portions of the several layers being disposed along separate concentric, conical surfaces, and means for supporting and bracing said extending portions of said winding comprising a member having spacing and bracing projections between which the extending portions of one layer of said winding are disposed and a second member interlocked with said first member and provided with spacing and bracing projections between which the extending portions of another layer of said winding are positioned.

7. A coil-end support for windings of the type having coil ends disposed in layers, comprising a plurality of members having transverse projections adapted to be disposed between the coil ends of said layers respectively, certain of said members being provided with recesses adapted to receive the projections on certain of the other members, and means for clamping said members and said coil ends together.

In testimony whereof the signature of the inventor is affixed hereto in the presence of two witnesses.

ROBERT B. WILLIAMSON.

Witnesses:
J. J. KANE,
W. H. LIEBER.